United States Patent [19]

Huber

[11] Patent Number: 4,675,771

[45] Date of Patent: Jun. 23, 1987

[54] FAULT SENSING SYSTEM FOR A TRANSFORMER NETWORK

[75] Inventor: William J. Huber, Waukesha, Wis.

[73] Assignee: Combined Technologies, Inc., Waukesha, Wis.

[21] Appl. No.: 759,269

[22] Filed: Jul. 26, 1985

[51] Int. Cl.[4] .............................................. H02H 7/04
[52] U.S. Cl. ....................................... 361/41; 361/57; 361/104; 200/144 B
[58] Field of Search ................... 200/144 B; 361/4, 8, 361/35, 38–41, 136, 36, 54, 55, 57, 104

[56] References Cited

U.S. PATENT DOCUMENTS 3,418,308  9/1964  Specht ................................... 361/35
3,471,814  10/1969  Burdett ............................ 200/144 B
4,174,529  11/1979  Hamann ................................ 361/57

FOREIGN PATENT DOCUMENTS 2030785  4/1980  United Kingdom ................. 361/41

Primary Examiner—A. D. Pellinen
Assistant Examiner—Howard L. Williams
Attorney, Agent, or Firm—Ronald E. Barry

[57] ABSTRACT

A fault sensing system for protecting a transformer, the system including a partial range current limiting fuse connected in series in the primary circuit for the network transformer, a normally open vacuum switch connected to the primary circuit and shunted to ground between the current limiting fuse and the transformer, a solenoid actuated assembly for closing the vacuum switch and a fault sensing circuit assembly operatively connected to energize the solenoid assembly, the fault sensing circuit being normally de-energized and including a current transformer mounted on the primary circuit and a low voltage fuse element connected across the current transformer, the fault sensing circuit assembly being energized on operation of the low voltage fuse element to momentarily energize the solenoid.

7 Claims, 5 Drawing Figures

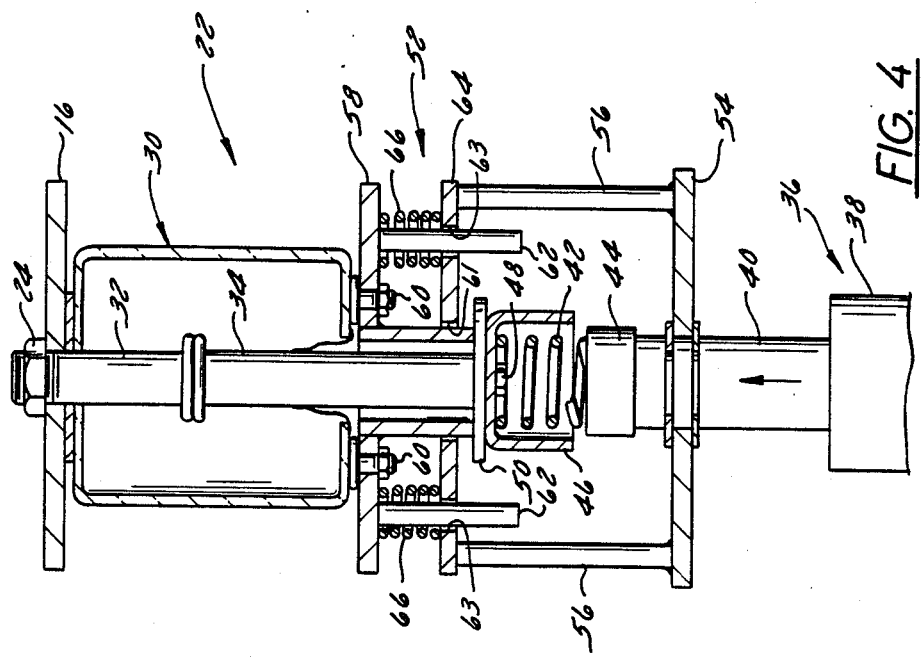
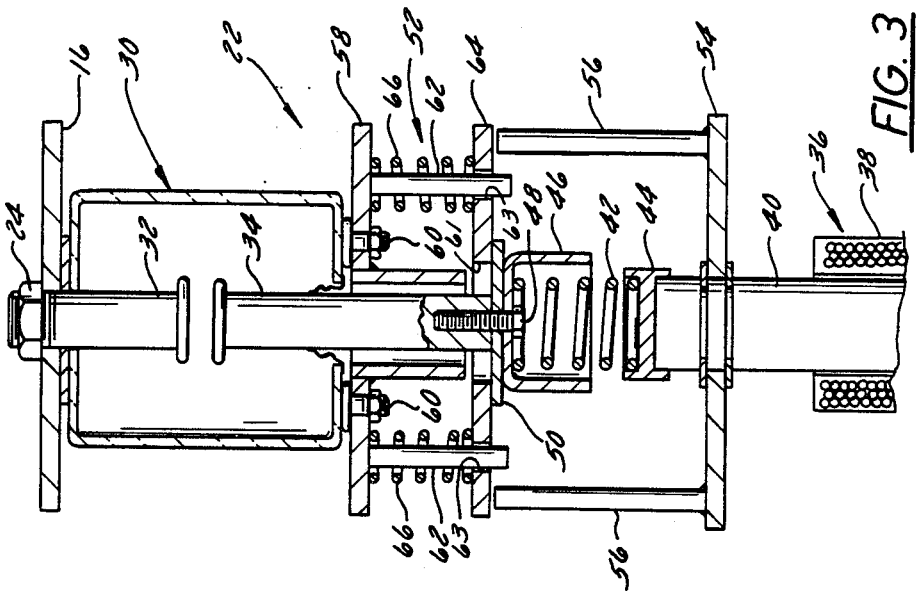

FAULT SENSING SYSTEM FOR A TRANSFORMER NETWORK

BACKGROUND OF THE INVENTION

Transformers used in the Network Systems are unique in that they must be able to supply enough power to the system to keep the system at full load capability even if one of the transformers fail. When a transformer does fail it is imperative to get the transformer off the system as fast as possible before the fault in the transformer draws enough energy from the Network System to create great physical damage to the transformer and the environment surrounding the transformer.

Past practice has been to put secondary breakers on the transformers so that the transformers can be tripped open when a fault occurs on the secondary side of the circuit. These breakers have not been reliable in their fault sensing response or operation. Also, in some instances the fault occurs between the secondary breaker and the transformer in which case the secondary breaker is of no help.

Until recently, there has been no individual protection provided on the primary side of these transformers. However, because of recent catastrophic failures on the primary side of the transformer resulting in much property damage and in some instances personal injury, efforts are now being made to provide protection on the primary side of the transformer. High voltage devices such as circuit breakers, switches and electronically operated fuses have become available and are being applied in the field. These devices generally include energized electronic sensing circuits which are quite complicated requiring sophisticated electronics. The reliability of these circuits is questionable since they must be capable of operating over the 20 to 30 year life of the transformer. Since these devices are now intended to be the last resort of protection in taking a failing transformer off the Network System, before the transformer violently fails, a design having relatively high reliability and simplicity is required.

Full range fuses cannot be used since they can melt open when a transformer has to pick up more than its rated load which can occur when another transformer has failed and is taken off the system. Backup current limiting fuses can be used only if combined with a low current fault clearing system. Low current fault clearing systems must be capable of responding not only to fault currents that are lower than the melting current of the back up fuse but also to temperature and/or pressure sensors installed in the transformer vault and/or on the transformer. These sensors respond to high internal pressures and to arcing or fires inside the transformer vault. These sensors provide a trip signal that clears the transformer off the system.

SUMMARY OF THE INVENTION

The fault sensing system according to the present invention combines a back up current limiting fuse with an electrically controlled vacuum switch which electrically shorts the high voltage primary circuit to ground. This causes the fault system fault current to flow through the current limiting back up fuse which will then operate to clear the transformer off the circuit in less than one-half cycle. This is much faster than a full range fuse or an electronically operated switch which might take from one to twenty cycles to clear low level fault currents. During the time required for a full range fuse or an electronically operated switch to clear, fault current is allowed to flow into the arc producing physical forces on the equipment. With the present invention, the fault current is immediately shunted to ground which shuts off the energy available to the arc, causing the arc to extinguish immediately. The current limiting fuse then clears the fault to ground and the vacuum switch automatically opens.

The present invention also has the capability of sensing the flow of fault current in the primary circuit, even if the level of current is below that which is required to operate the back up fuse. As stated earlier, the fault sensing system must have the highest degree of reliability since its life should be 20 to 30 years. In the present invention, the fault sensing is done by a 100 to 1 current transformer which is connected to a low voltage fuse element. When a fault current occurs in the primary circuit, it appears in the low voltage fuse element causing the element to melt. When the low voltage fuse element melts, a trip signal is sent to the vacuum switch which momentarily closes to short the primary circuit to ground. An advantage of this system is that the current sensing circuit has been purposely designed so that the electrical circuit is in the "off" mode until a fault current occurs. On sensing a fault, the electrical circuit is turned "on" to send a trip signal to the vacuum switch. This mode of operation gives the components of the electrical circuit an unlimited life which greatly increases the reliability of the system In other electronic sensing schemes, the electronic components are "on" continuously to monitor the current which can adversely affect the life of these components. These components also include sensors which require precise timing circuits or capacitors that can also change with the ambient temperature or age. In the present invention, the low voltage fuse elements takes the place of such circuits or capacitors and is therefore impervious to age or temperature since the normal load current through it is generally one-fourth of the full load rating of the fuse element.

IN THE DRAWINGS

FIG. 3 is a view taken in line 3—3 of FIG. 1, showing the vacuum switch assembly in the open mode.

FIG. 4 is a view similar to FIG. 3, showing the switch assembly in the closed mode.

DESCRIPTION OF THE INVENTION

Figure 1:
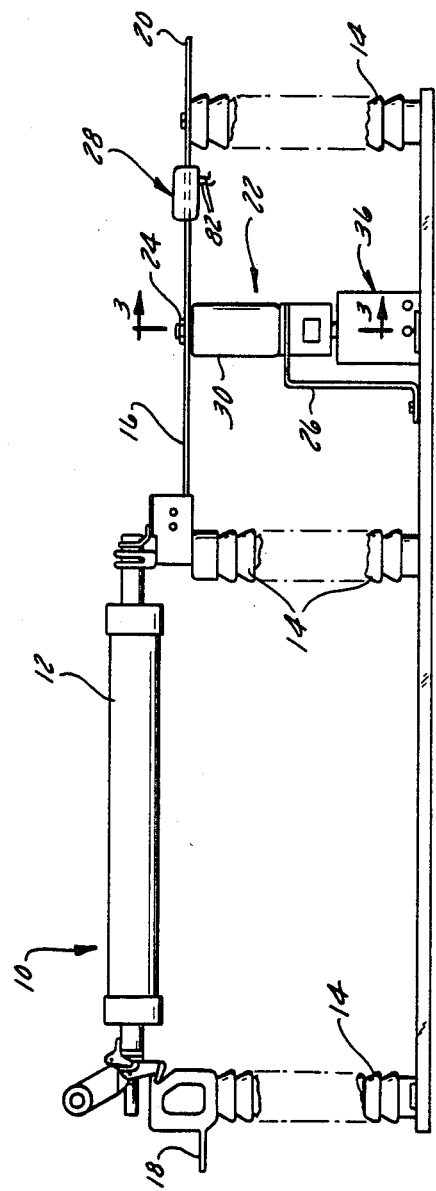
FIG. 1 is a side view of the fault sensing system according to the invention.
Figure 2:
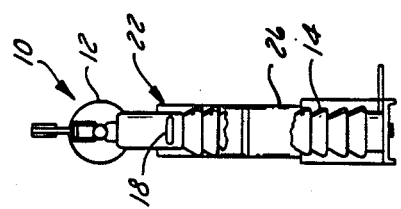
FIG. 2 is an end view of the fault sensing system shown in FIG. 1.

The fault sensing system 10 according to the present invention generally includes a high voltage current limiting partial range fuse 12 supported by means of insulators 14. The fuse is connected to buswork 16 at one end and to the high voltage circuit by a contact 18 at the other end. The network transformer is connected to the buswork 16 at point 20. The buswork is shorted to ground by means of a vacuum switch assembly 22 which is connected to the buswork at 24 and to the ground through the lead 26. The switch assembly 22 is normally open and closes in response to fault currents in the buswork 16 sensed by means of a current transformer circuit assembly 28 shown mounted on the buswork 16. It should be understood that the current sensing circuit assembly 28 could also be mounted on the high voltage cable connection to the buswork 16 at point 20. When a fault current is present in the system, the current sensing device 28 sends a signal to the vacuum switch assembly 22 which momentarily closes causing the full system available fault current to flow through the current limiting fuse 12 to ground. The current limiting fuse 12 will ordinarily operate in one-half cycle to clear the fault current from the system, however, the transformer is protected from full fault current which has been grounded through the vacuum switch assembly 22.

The switch assembly 22 as seen in FIGS. 3 and 4 includes a housing 30 having a stationary contact 32 at one end connected to the busbar 16 and a movable contact 34 at the other end which is operatively connected to a solenoid 36. The solenoid includes a coil 38 and a rod 40. When the coil is energized, the rod 40 moves upward, pushing the movable contact 34 into engagement with stationary contact 32 through a compression spring 42. In this regard, the spring 42 is positioned between a cup 44 provided on the end of the rod 40 and a cup 46 secured to the movable contact 34 by means of a bolt 48. Electrical connection of the ground lead 26 to the contact 34 is provided by means of a conductive plate 50 positioned between the cup 46 and the end of the stationary contact 34.

Positive release of the movable contact 34 from the fixed contact 32 on de-energization of the coil 38 is assured by means of a kick assembly 52. In this regard and referring to FIG. 4, the kick assembly 52 includes a striker plate 64 supported on conductive plate 50 on contact 34, a moveable plate 54 mounted on the rod 40 and a fixed plate 58 mounted on housing 30. The striker plate 64 includes a central opening 61 and a pair of guide holes 63. The moveable plate 54 includes a rod 56 mounted on each side of the rod 40 in a position to engage the striker plate 64. The fixed plate 58 is secured to the housing 30 by means of bolt 60 and includes a pair of guide rods 62. The striker plate 64 is normally biased by means of springs 66 into engagement with the conductive plate 50 as seen in FIG. 3 with the guide holes 63 aligned with the rods 62.

When the coil 38 is energized, the rod 40 moves upward compressing the spring 42 to push the movable contact 34 into engagement with the fixed contact 32. At the same time, the rods 56 on the plate 54 are moved into engagement with the striker plate 64 pushing the striker plate off the conductive plate 50 and compressing the springs 66. It should be noted that the striker plate is moved off of the conductive plate 50 when the movable contact 34 bottoms out on the fixed contact 32. When the coil 38 is de-engergized, the springs 66 will accelerate the movement of the plate 64 into engagement with the plate 50 to provide a kick to release the movable contact 34 from the fixed contact 32 in the event any welding effect has resulted on movement of the contact 34 into engagement with the contact 32.

Figure 5:
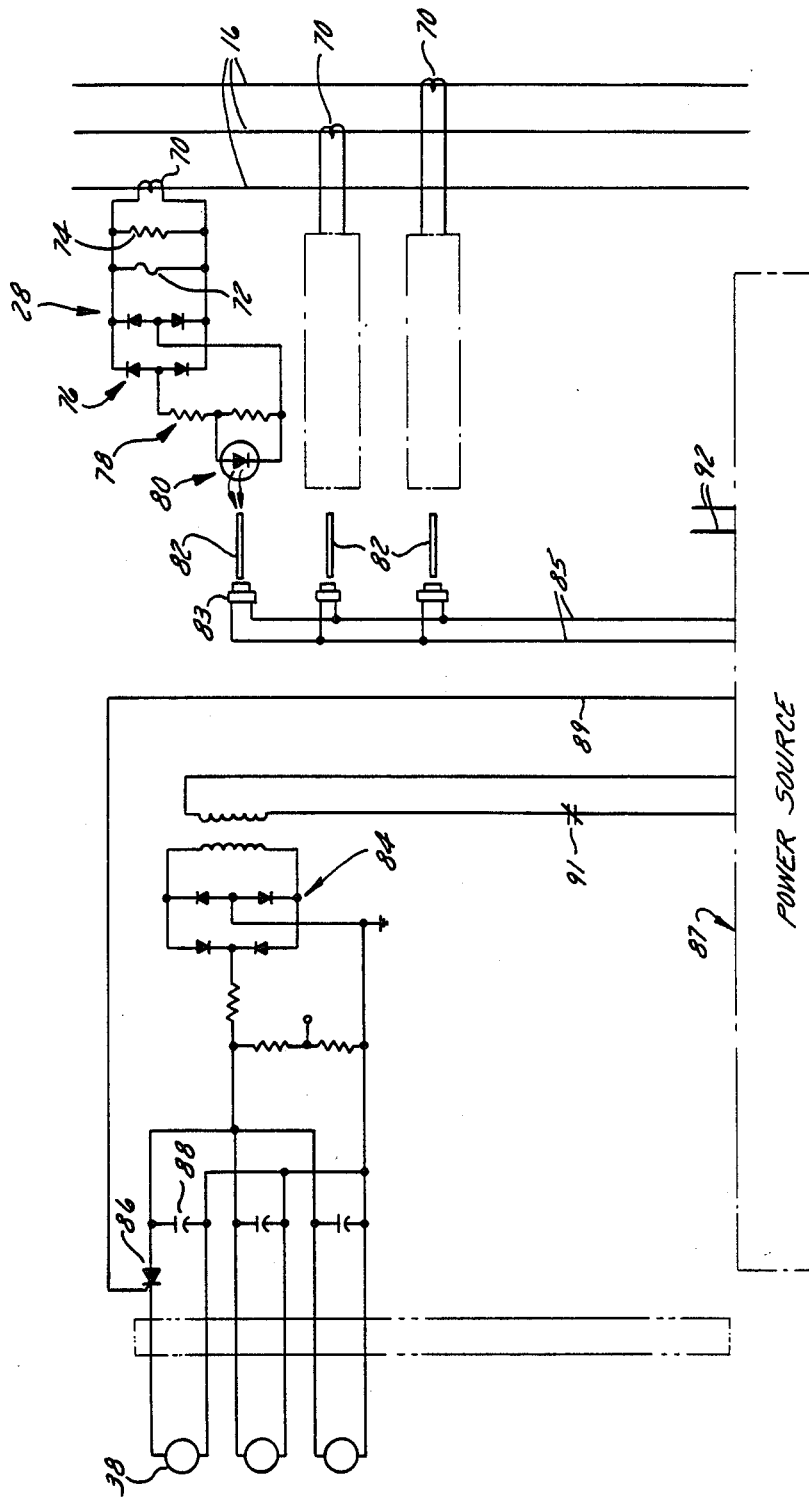
FIG. 5 is a schematic view of the electrical circuit for fault sensing system.

The current transformer circuit assembly 28, includes a trip circuit as seen in FIG. 5 that is used to energize the solenoid coil 38 when a fault current appears on the buswork 16. The circuit assembly generally includes a current transformer 70 connected to each of the busbars 16. Since each of the circuit assemblies are identical, only one will be described herein. Current transformer 70 monitors the current in the busbar 16 and reduces the current by a preset ratio, i.e. 100 to 1. The reduced current is sent through a low voltage fuse element 72 which is connected in parallel with a burden resistor 74 across an AC - DC rectifier bridge 76. The fuse element 72 can be made to melt at various desired levels of fault currents flowing in the busbar 16 by selecting elements of different melt characteristics. Once the element melts, the burden resistor causes the current transformer 70 to saturate, i.e. put out a constant voltage regardless of the magnitude of the current flowing in the bar 16. The voltage is rectified from AC to DC by the bridge circuit 76. The output voltage from the rectifier 76 is reduced in magnitude by a voltage divider 78 which is connected to a light emitting diode 80. The light signal from the diode 80 is transmitted through a fiber optic cable 82 to a detector 83 which is connected by lines 85 to a power source 87. The power source is conventional in that it is used to provide power to the control circuit 84 when triggered by the circuit assembly 28.

The control circuit 84 is used to charge a capacitor 88 that is connected across the solenoid 38. The detector 83 provides a signal to the power source which energizes the gate circuit 89 for a silicon controlled rectifier 86 connected in series with the capacitor 88. Activating the rectifier 86 allows the capacitor 88 to discharge its energy through the solenoid coil 38 to momentarily close contact 34 against fixed contact 32.

The use of the fiberoptic cable 82 to provide the signal from the current sensing assembly 28 to the control circuit 84 acts as electrical insulation to protect the control circuit from false signals. If a hard wire connection were used instead of the fiberoptic cable, the system would operate but the hard wire could act like an antenna and pick up electrical fields in the area. This could be enough of an induced voltage to fool the control circuit into tripping when it shouldn't.

Once the switch assembly 22 shorts the primary to ground, the back up fuse 12 will operate clearing the fault off the system. As soon as the capacitor 88 discharges, the coil 38 will be de-energized and the contact 34 will be moved away from contact 32 to the ground connection. This is important since the system must not be grounded when it is returned to service. Opening of the switch assembly 22 is assured by the action of the striker plate 64 which provides a positive striking force against the plate 50 to move the contact 34 away from contact 32 in the event of any welding occuring on closing of the contacts 32, 34.

A relay switch 91 can be provided in the control circuit 84 to open the circuit and de-energize the system whenever the partial range fuse operates so that the system will not continue to operate the shorting switch unnecessarily.

It should also be noted that the control circuit 84 can be tripped by sensing means other than the fault current sensor. Such means can be in the form of pressure and-/or temperature sensors located in the network transformer or vault. The signals would be brought into the control circuit 84 through input connections 92 located on the power source 87. The control circuit 84 would operate in the same manner as operated by the fault sensing systems.

I claim:

1. A fault sensing system for protecting a transformer comprising a current limiting partial range fuse connected in series in the primary circuit of the transformer, first means for shorting the primary circuit to ground, said first means comprising a vacuum switch having a fixed contact connected to the primary circuit and movable contact connected to ground, and solenoid means connected to move the movable contact into engagement with the fixed contact, second means for providing a signal in response to the presence of low fault currents in the primary circuit, said second means including a current transformer and a circuit assembly connected to said current transformer to provide a trip signal whenever a fault current is sensed by said current transformer, said circuit assembly including a fuse element connected across said current transformer, said circuit assembly being activated on interruption of said fuse assembly, circuit means connected to said solenoid means and being responsive to a signal from said second means for momentarily energizing said solenoid means when a fault current is present in the primary circuit whereby said partial range fuse will be shorted to ground when a fault current is sensed on the primary current, third means for releasing the movable contact from the fixed contact on de-energization of the solenoid means, said third means including a conductive plate connected to the movable contact, and a striker plate biased into engagement with the conductive plate, said striker plate being moved away from the conductive plate on closing of the movable contact with the fixed contact, said striker plate being released on de-energization of the solenoid for movement into engagement with said conductive plate to provide a positive striking force against said conductive plate to release said movable contact from said fixed contact.

2. A fault sensing system for disconnecting a failing transformer from a transformer network, said system comprising.

a partial range fuse connected in the primary circuit of the transformer, a normally open vacuum switch connected to the primary circuit between the fuse and the transformer to short the primary circuit to ground, and current sensing means for closing the vacuum switch in response to a fault current in the primary circuit, said sensing means including a current transformer for sensing current in the primary circuit, and a low voltage fuse element connected to respond to the current sensed by said current transformer whereby on operation of said fuse element the vacuum switch will close to short the primary to ground and said partial range fuse will operate to isolate the transformer from the network system.

3. A fault shorting system for a transformer comprising a current limiting partial range fuse connected in series in the primary circuit of the transformer, a normally open vacuum switch operatively connected to shunt the primary circuit to ground, closing means for closing said vacuum switch, sensing means for providing a signal in response to the presence of a fault condition in the transformer, said sensing means including a current transformer mounted on said primary circuit and a circuit assembly connected to said current transformer to provide a trip signal whenever a fault current is sensed by said current transformer, said circuit assembly including a fuse element connected across said current transformer, said circuit assembly being operatively connected to actuate said closing means in response to interruption of said fuse element whereby said partial range fuse will be shorted to ground.

4. The system according to claim 3 wherein said vacuum switch includes a fixed contact connected to the primary circuit and a movable contact connected to ground and said closing means includes a solenoid assembly connected to move said movable contact into engagement with said fixed contact; said circuit assembly being connected to said solenoid assembly to momentarily energize said solenoid assembly in response to a signal from said sensing means.

5. The system according to claim 1 wherein said solenoid assembly includes third means for releasing said movable contact from said fixed contact on deenergization of said solenoid assembly, said third means including a conductive plate connected to the movable contact, and a striker plate biased into engagement with the conductive plate, said striker plate being moved away from the conductive plate on closing of the movable contact with the fixed contact, said striker plate being released on de-energization of the solenoid assembly for movement into engagement with said conductive plate.

6. A fault sensing system for disconnecting a failing transformer from a transformer network, said system comprising, a partial range fuse connected in the primary circuit of the transformer, a normally open vacuum switch connected to the primary circuit between the fuse and the transformer to short the primary circuit to ground, a control circuit for momentarily closing said vacuum switch, sensing means for sensing a fault current in the primary circuit and electrically insulated circuit means for connecting said sensing means to said control circuit for closing the vacuum switch in response to a fault condition in the transformer primary circuit, said sensing means includes a current transformer for sensing current in the primary circuit, and a low voltage fuse element connected to respond to the current sensed by the current transformer whereby on operation of said fuse element the vacuum switch will close to short the primary to ground and said partial range fuse will operate to isolate the transformer from the network system.

7. The fault sensing system according to claim 6 wherein said electrically insulated circuit means includes a fiber optic cable for transmitting the signal from the sensing means to said control circuit.

* * * * *